US009091290B2

United States Patent
Singh et al.

(10) Patent No.: US 9,091,290 B2
(45) Date of Patent: Jul. 28, 2015

(54) PUNCH RIVET AND DIE

(71) Applicants: Sumanjit Singh, Gaimersheim (DE); Wolfgang Wenzl, Katsdorf (AT)

(72) Inventors: Sumanjit Singh, Gaimersheim (DE); Wolfgang Wenzl, Katsdorf (AT)

(73) Assignee: Sumanjit Singh, Gaimersheim (DE)

( * ) Notice: Subject to any disclaimer, the term of this patent is extended or adjusted under 35 U.S.C. 154(b) by 161 days.

(21) Appl. No.: 13/935,256

(22) Filed: Jul. 3, 2013

(65) Prior Publication Data

US 2013/0294866 A1 Nov. 7, 2013

Related U.S. Application Data

(62) Division of application No. 12/305,821, filed as application No. PCT/EP2007/005376 on Jun. 19, 2007, now Pat. No. 8,506,228.

(30) Foreign Application Priority Data

Jun. 21, 2006 (DE) .......................... 10 2006 028 537

(51) Int. Cl.
*F16B 19/08* (2006.01)
*B21J 15/02* (2006.01)
*B21J 15/36* (2006.01)

(52) U.S. Cl.
CPC ............... *F16B 19/08* (2013.01); *B21J 15/025* (2013.01); *B21J 15/36* (2013.01); *F16B 19/086* (2013.01); *Y10T 29/49835* (2015.01); *Y10T 29/49956* (2015.01)

(58) Field of Classification Search
CPC ............................... F16B 19/08; F16B 19/086
See application file for complete search history.

(56) References Cited

U.S. PATENT DOCUMENTS

| | | | |
|---|---|---|---|
| 4,610,072 A | 9/1986 | Muller | |
| 4,711,021 A | 12/1987 | Muller | |
| 5,140,735 A | 8/1992 | Ladouceur | |
| 6,385,843 B1 | 5/2002 | Singh et al. | |
| 6,763,568 B1 | 7/2004 | Mauermann | |
| 6,883,223 B2 | 4/2005 | Edwards | |
| 6,979,160 B2 | 12/2005 | Babej et al. | |
| 7,047,617 B2 * | 5/2006 | Ladouceur | .................. 29/432.1 |

(Continued)

FOREIGN PATENT DOCUMENTS

| | | |
|---|---|---|
| DE | 43 33 052 | 3/1995 |
| DE | 44 31 769 | 3/1996 |

(Continued)

OTHER PUBLICATIONS

Japanese Office Action (with English language Translation of a relevant portion thereof) issued in counterpart Japanese application No. 2009-515756.

(Continued)

*Primary Examiner* — Gary Estremsky
(74) *Attorney, Agent, or Firm* — Greenblum & Bernstein, P.L.C.

(57) ABSTRACT

A punch rivet and a die for the production of a punch rivet connection are described. The punch rivet is characterized by special rivet foot and underhead geometries. In the region of the rivet foot, the shank outer face and shank inner face are connected by way of a small radially outer radius and a larger radially inner radius, which radii merge into one another tangentially. The angle that the common tangent encloses with a radial plane is in the range of 10°±20°. The die is preferably matched to the described punch rivet, but can also be used in combination with conventional punch rivets.

27 Claims, 3 Drawing Sheets

(56) References Cited

U.S. PATENT DOCUMENTS

Figure 7:
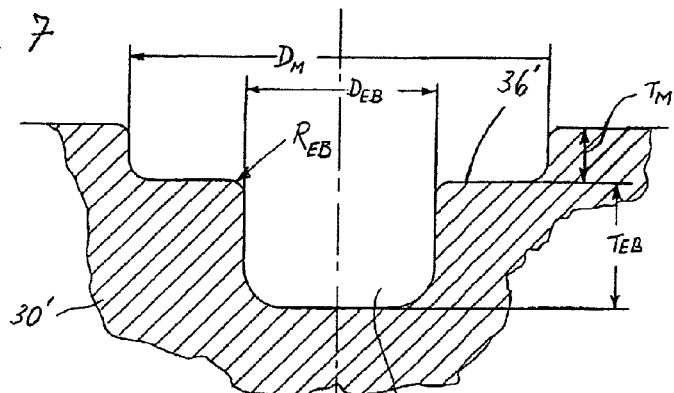

| | | | |
|---|---|---|---|
| 7,284,319 B2 * | 10/2007 | Kato et al. | 29/798 |
| 7,425,111 B2 * | 9/2008 | Ladouceur | 411/181 |
| 7,762,753 B2 | 7/2010 | Jokisch | |
| 2002/0006321 A1 | 1/2002 | Singh et al. | |
| 2003/0101566 A1 | 6/2003 | Ladouceur | |
| 2004/0010903 A1 | 1/2004 | Edwards | |
| 2004/0022602 A1 | 2/2004 | Singh et al. | |
| 2004/0068854 A1 | 4/2004 | Kato et al. | |
| 2004/0216304 A1 | 11/2004 | Naito | |
| 2005/0008453 A1 | 1/2005 | Babej et al. | |
| 2005/0111934 A1 * | 5/2005 | Ladouceur | 411/501 |
| 2008/0232930 A1 | 9/2008 | Jokisch | |
| 2010/0232906 A1 | 9/2010 | Singh et al. | |

FOREIGN PATENT DOCUMENTS

| | | |
|---|---|---|
| DE | 200 01 103 | 5/2000 |
| DE | 203 19 610 | 3/2004 |
| DE | 20 2005 012677 | 10/2005 |
| EP | 0 720 695 | 12/1998 |
| EP | 1 064 466 | 3/2002 |
| EP | 1 229 254 | 8/2002 |
| EP | 1 387 093 | 4/2004 |
| JP | 09317730 | 12/1997 |
| JP | 2001-159409 | 6/2001 |
| JP | 2003-501269 | 1/2003 |
| JP | 2003-340543 | 12/2003 |
| JP | 2004-060855 | 2/2004 |
| JP | 2004-322198 | 11/2004 |
| JP | 2004-345490 | 12/2004 |
| JP | 2005-504243 | 2/2005 |
| JP | 2005-219589 | 8/2005 |
| JP | 2009-504999 | 2/2009 |
| WO | WO 00/76688 | 12/2000 |
| WO | WO 02/02259 | 1/2002 |
| ZA | 9 108 340 | 7/1992 |

OTHER PUBLICATIONS

Japanese Office Action (with English language Translation) issued on Aug. 6, 2013 in counterpart Japanese application No. 2009-515756.
Russia Office action that issued patent family member Russian Patent Application No. 2009101815/02 along with an english translation thereof.
Opposition dated Aug. 8, 2007 with respect to German Patent No. DE 10 2006 028 537 B3, and an English language translation thereof.
Order confirmation dated Jul. 28, 2005 (*Annex E1*).
Delivery receipt 44857 dated Oct. 28, 2005 (*Annex E2*).
Invoice 157734 dated Oct. 28, 2005 (*Annex E3*).
Delivery receipt 43830 dated Aug. 25, 2005 (*Annex E4*).
Delivery receipt 45883 dated Jan. 11, 2006 (*Annex E5*).
Invoice 158607 dated Jan. 12, 2006 (*Annex E6*).
Modular parts list (*Annex E7*).
Drawing ID No. 1979 2761 300 (*Annex E8*).
Drawing ID No. 1992 4427505 (*Annex E9*).
Test report No. 0165/05 dated May 12, 2005 (*Annex E10*).
Test report No. 0166/05 dated May 12, 2005 (*Annex E11*).
Test report No. 0167/05 dated May 12, 2005 (*Annex E12*).
Test report No. 0354/04 dated Jul. 30, 2004 (*Annex E13*).
Test report No. 0349/04 dated Jul. 28, 2004 (*Annex E14*).
Test report No. 0745/03 dated Nov. 25, 2003 (*Annex E15*).
Test report No. 0046/04 dated Jan. 30, 2004 (*Annex E16*).
Drawing "FM 100 2010" (*Annex E17*).
Drawing ID No. 1992 4427 506 (*Annex E18*).
Drawing, ID No. 1994 4227 506 (*Annex E19*).
Drawing ID No. 1992 4425 304 (*Annex E20*).
Drawing "FM 070 2206" (*Annex E21*).
Invoice 15440, dated Feb. 2, 2005 (*Annex E22*).
Delivery receipt 39556, dated Oct. 19, 2004 (*Annex E23*).
Consignment receipt BST VA 4416 dated Nov. 3, 2004 (*Annex E24*).

* cited by examiner

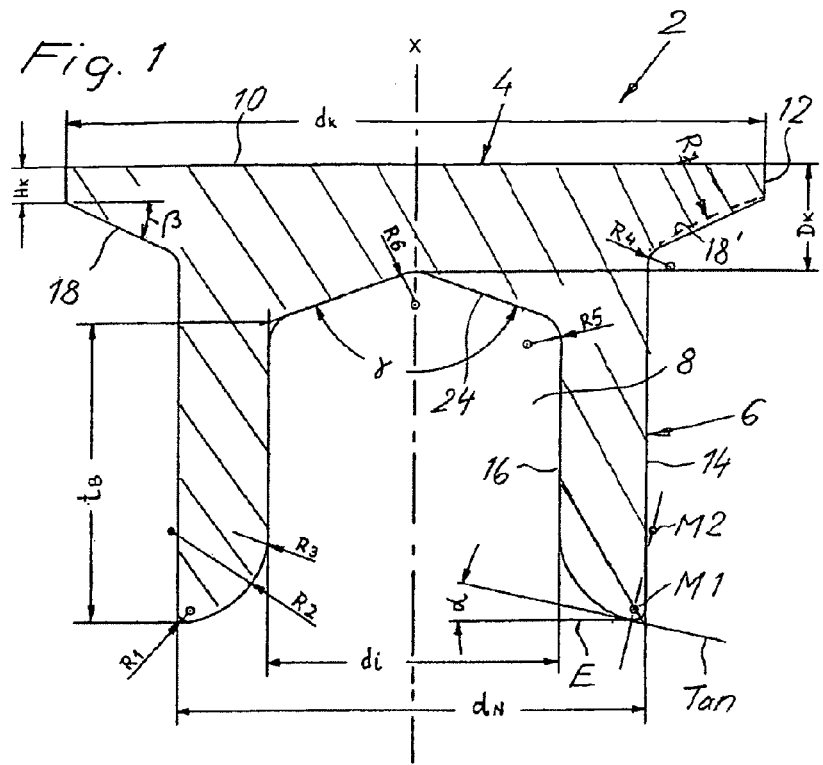
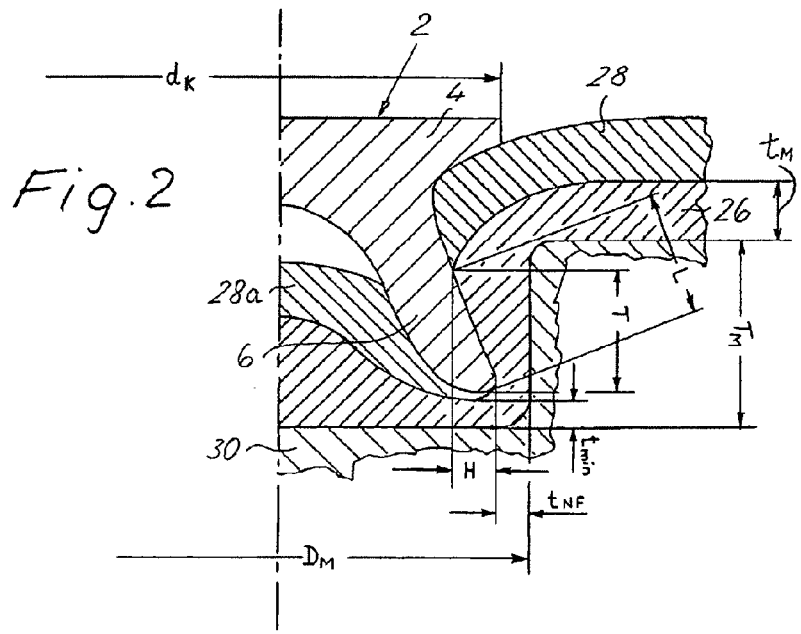

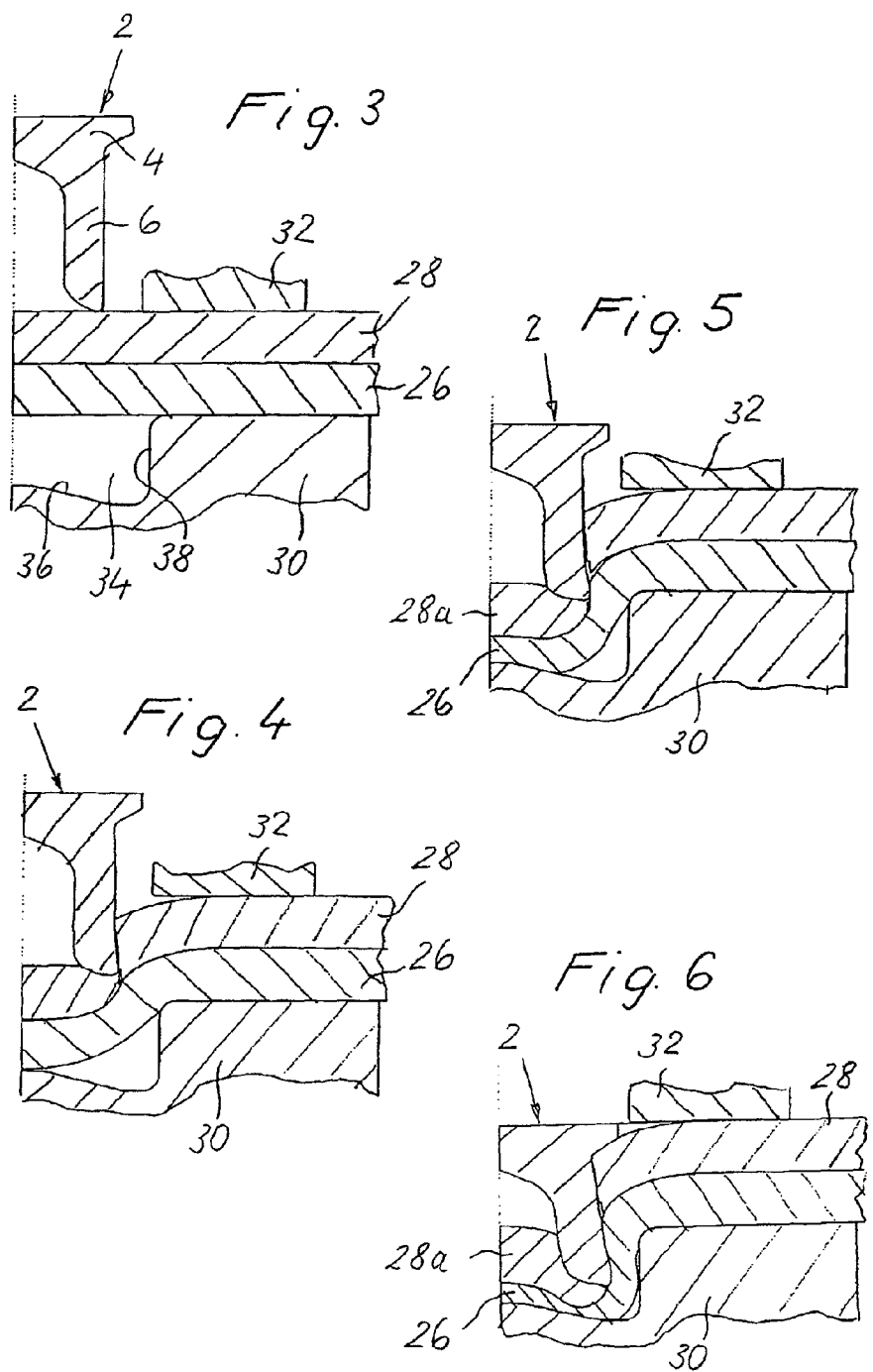

PUNCH RIVET AND DIE

CROSS-REFERENCE TO RELATED APPLICATIONS

This application is a divisional of U.S. application Ser. No. 12/305,821, which is a US National Stage of PCT/EP2007/005376 filed on Jun. 19, 2007 and which published as WO 2007/147551 on Dec. 27, 2007. This application also claims the right of priority granted under 35 U.S.C. §§119 and 365 of German Application No. 10 2006 028 537.9 filed on Jun. 21, 2006. The disclosure of each of these applications is incorporated by reference herein in its entirety.

The present invention relates to a punch rivet that can be embodied as a simple rivet or else as a functional element such as, for example, a punch bolt or punch nut. In particular the invention relates to a punch rivet in the form of a semi-hollow punch rivet or hollow punch rivet for the production of a punch rivet connection to one or more plate-shaped parts to be joined (plates). The invention furthermore relates to a die that can be used in the production of the punch rivet connection. The die is preferably matched in a special manner to the geometry of the punch rivet, but can also be used in combination with conventional punch rivets.

Punch riveting as a joining method has gained increasing importance in the recent past. An important parameter for the joining process as well as the connection quality of the punch rivet connection is the geometry of the punch rivet. Numerous different geometries of the punch rivet are known in the prior art, see e.g. EP 0 720 695, EP 1 064 466, EP 1 229 254, EP 1 387 093, DE 44 31 769, DE 203 19 610 U1, DE 200 01 103 U1, US 2004/0068854 A1, JP 2001159409A, JP 09317730A, among others.

The punch rivet according to the above-mentioned EP 0 720 695, which is usually called a C-rivet, is used on a large scale in the automotive industry, but also in other technical areas. The C-rivet is a semi-hollow punch rivet with a rivet head and a rivet shank with a central shank hole, of which the rivet head has a flat upper side and a cylindrical head outer face and the rivet shank has a cylindrical shank outer face and a cylindrical shank inner face delimiting the central shank hole. The cylindrical head outer face and the cylindrical shank outer face are connected together directly by a relatively large radius. In the foot region of the punch rivet the central shank hole is embodied as a cone, wherein the cone flanks are to be slightly curved according to the details in this document. By these means in the scope of the production engineering possibilities, a quasi "sharp edge" is created at the outer edge of the rivet shank, which sharp edge in practice is generally somewhat chamfered. According to the details in this document, the opening angle of the cone can be between 25° and 120°.

In the prior art the starting point for configuring punch rivets was usually the so-called "pierce and roll" behavior of the punch rivets. "Pierce and roll" means that the punch rivet is spread (roll) into the lower sheet as soon as possible after the penetration (pierce), in order to achieve the greatest possible spreading and thus the largest possible undercut of the punch rivet in the punch rivet connection. These considerations have led to rivet geometries such as, for example, that of the C-rivet and corresponding dies, for example with a mandrel.

Although the C-rivet has proved to be successful in practice, further improvements are desirable such as, e.g., an improved bearing behavior of the punch rivet connection and an improved cost-effectiveness of the joining method.

The object of the present invention is to create a punch rivet for the production of a punch rivet connection with one or more parts to be joined, which rivet allows an optimization of the bearing behavior of the punch rivet connection as well as a particularly economical joining process, in particular by a lowering of the requirements for strength and hardness of the punch rivet material and a reduction in the setting forces required for the joining process. Furthermore, a die suitable for this is to be created that is preferably matched to the geometry of the punch rivet embodied according to the invention, but that can also be used in combination with other rivet geometries.

Punch rivets according to the present invention for attaining this object are defined in claims 1 and 2.

The punch rivet embodied according to the invention is characterized in particular by a special rivet foot geometry and a special underhead geometry, as are given by claims 1 and 2.

According to the solution of claim 1, the shank outer face and shank inner face at the rivet head end are connected by means of a radially outer first radius $R_1$ and a radially inner second radius $R_2$ that merge into one another tangentially. The common tangent of $R_1$ and $R_2$ encloses an angle $\alpha$ of 10°±20° with a radial plane of the punch rivet. The first radius $R_1$, which merges tangentially into the shank outer face or is replaced by a chamfer of corresponding length, is 0.3±0.2 mm and the second radius $R_2$, which merges tangentially into the shank inner face, is (0.7 to 1.2) $(d_N-d_i)/2$, in particular (0.8 to 1.0) $(d_N-d_i)/2$. The factor (0.7 to 1.2) or (0.8 to 1.0) is preferably selected to be increasingly larger as $R_1$ becomes larger.

If the result of radii $R_1$ and $R_2$ selected within the given value ranges is that no second radius $R_2$ can be found that is tangent to both the first radius $R_1$ and the shank inner face, according to the alternative solution of claim 2 a third radius $R_3$ is provided between the second radius $R_2$ and the shank inner face, which radius merges tangentially both into the second radius $R_2$ and into the shank inner face and is 0.8±0.4 mm. The angle $\alpha$ between the common tangent of $R_1$, $R_2$ and a radial plane of the punch rivet is then to be selected in the range of 5°±10°.

The geometry in the underhead region of the rivet head is characterized in both solutions in that the head outer face and the shank outer face are connected through a conical or slightly curved underhead chamfer and an underhead radius, of which the underhead radius merges tangentially into both the underhead chamfer and the shank outer face. In the case of a conical underhead chamfer, the underhead chamfer encloses an angle $\beta$ of 25°±10°, in particular 25°±7°, with a radial plane of the punch rivet. In the case of a slightly curved underhead chamfer, the curvature radius is $R_7 \geq 2.0$ mm.

The punch rivet geometry according to the invention means a turning away from the "pierce and roll" behavior of the punch rivet explained above. As will be explained in more detail based on the Figures, the starting point for the present invention is the realization that in addition to the quality criteria of the undercut of the spread punch rivet section and the axial minimum thickness of the die-side part to be joined (sheet) at the rivet foot, other quality criteria of the punch rivet connection must be brought in for the achievement of an optimum bearing behavior. These criteria, as will be explained in more detail based on the Figures, are the so-called engagement length L (engagement between the outer face of the rivet foot and the die-side part to be joined), the so-called bearing depth T (axial component of the engagement length L), and the radial thickness $t_{NF}$ of the die-side part to be joined that surrounds the rivet foot.

The rivet geometry was selected according to the invention such that the engagement length L, the bearing depth T, and the thickness $t_{NF}$ of the punch rivet connection are maximized. The consideration in this regard is that the bearing behavior of the punch rivet connection can be improved if a maximizing of the undercut of the spread-out punch rivet section is given up in favor of an improved "force closure" between the rivet shank and the die-side part to be joined (sheet). An improved "force closure" results through an enlargement of the cross sections and outer faces of the punch rivet in engagement on the one hand and the parts to be joined on the other hand, through which the special loading of the force-transmitting areas is minimized. Moreover this leads to a reduction in the radial compression stresses, so that with external loading of the punch rivet connection, the size of the total stresses resulting from the superimposition remains within bounds. Due to the maximizing of the engagement length L, the bearing depth T, and the thickness $t_{NF}$ achieved through the invention, with adequate undercut of the spread-out punch rivet section and minimum axial thickness $t_{min}$ of the part to be joined, the surface pressing between punch rivet and parts to be joined is reduced, which again improves the stiffness and fatigue strength of the punch rivet connection. The rivet foot geometry according to the present invention also leads to the result that during the joining process the punch rivet penetrates the punch-side part to be joined essentially in a cutting process and that the rivet shank is not spread until during penetration into the die-side part to be joined. The result is a less resistant sliding of the rivet foot along the parts to be joined. These facts lead to a minimizing of the setting force required, the consequence of which in turn is that the requirements for hardness and strength of the punch rivet material are clearly reduced and the production and processing of the punch rivets become simpler and much cheaper.

In a further development of the invention a specially dimensioned die is provided for the punch rivet embodied according to the invention. A die embodied according to the invention is defined in claim 19. In accordance with this, the following holds true for the die diameter $$D_M = d_N + (0.6 \text{ to } 1.5) 2 t_M, \text{ in particular } d_N + (0.7 \text{ to } 1.2) 2 t_M$$

for parts to be joined that are made of a material with good deformability, in particular made of a wrought alloy, and $$D_M \leq 2.2 d_N$$

for parts to be joined that are made of a cast material or another material of low deformability, wherein $d_N$ is the shank outer diameter of the rivet shank and $t_M$ is the thickness of the die-side part to be joined. The depth $T_M$ for parts to be joined that are made of a material of good deformability is preferably in the range $T_M = (1.0 \text{ to } 2.5) t_M$, in particular $T_M = (1.1 \text{ to } 2.2) t_M$. The depth $T_M$ for parts to be joined that are made of materials of low deformability is preferably $\leq 0.15 D_M$ and/or $\leq t_M$.

The result of these formulas is that the die diameter is smaller than in the prior art. The smaller die diameter in turn promotes the desired reduction in the spreading-out of the rivet shank.

According to claim 20 a die embodied according to the invention is characterized in that the die has a central depression on the die floor that during the joining process ensures pressure relief during the joining process.

The punch rivet embodied according to the invention is particularly suited for the joining of parts to be joined that are made of higher-strength steels, in particular AHSS steels as well as metastable austenitic steels such as, e.g., H400. In principle, however, the punch rivet is suitable for the joining of parts to be joined that are made of any materials including plastic. The punch rivet can be composed of conventional materials, whereby however, as mentioned, hardness and strength of the material can be much lower than in the prior art. The reduction in the required setting forces made possible through the invention and the substantial improvement in the bearing behavior make it possible, for example, that with the claimed rivet geometry even rivets of aluminum alloys such as, e.g., AlMgSi1 T6/T7 are suitable for the riveting of aluminum semi-finished products.

The punch rivet embodied according to the invention can be a semi-hollow punch rivet (in which the central shank hole is a blind hole) or a hollow punch rivet (in which the central shank hole is a through hole). The punch rivet can be a pure rivet or a functional element, in particular a punch bolt or a punch nut.

The rivet shank can have a cylindrical shank outer face or an axially ribbed shank outer face. The axial ribbing serves as an anti-rotation element during the joining process, in particular when the punch rivet is embodied as a functional element. The axial ribbing of the shank outer face does not require any additional joining forces. This is advantageous compared to star-shaped ribbings under the rivet head, as are known from the prior art.

If the punch rivet is embodied as a functional element, it can also be used in combination with a single part to be joined (sheet).

The rivet head is preferably embodied as a countersunk head. Depending on the application case, however, a flat head can also be used.

Further advantageous embodiments and developments of the invention are defined in the dependent patent claims.

Figure 8:
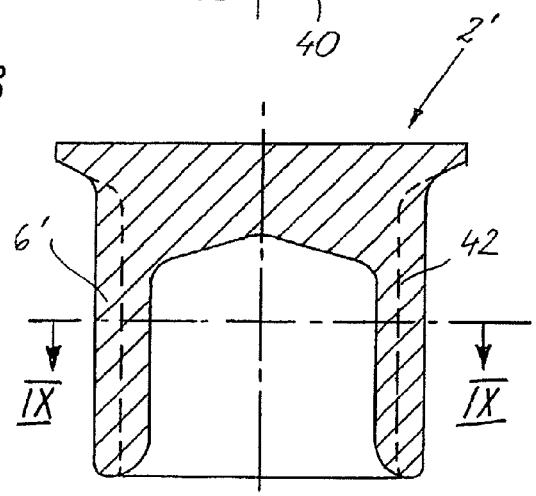
Figure 9:
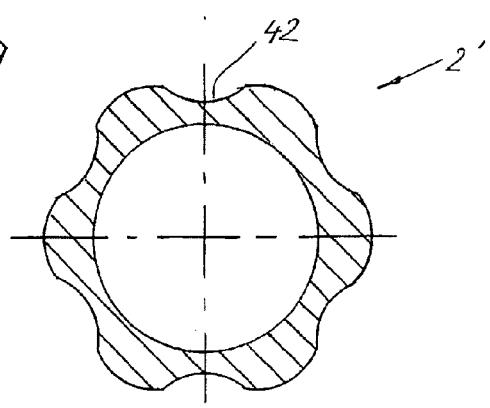

Based on the drawings, further details of the invention and preferred embodiments of the invention are explained. They show:

FIG. 1 an axial section of a punch rivet embodied according to the invention;

FIG. 2 a half axial section through a finished punch rivet connection for illustrating certain quality criteria of the punch rivet connection;

FIGS. 3 to 6 diagrammatic representations of a punch rivet process in various operating phases;

FIG. 7 a sectional representation of a part of a modified die;

FIG. 8 an axial section through a modified embodiment of the punch rivet;

FIG. 9 a cross section in the view direction of the arrows IX-IX in FIG. 8.

Based on FIG. 1 a specific exemplary embodiment of a semi-hollow punch rivet embodied according to the invention is described.

The punch rivet 2 is embodied rotation-symmetrically with respect to a central axis X and is composed of a rivet head 4 and a rivet shank 6 with a central shank hole 8 that is embodied as a blind hole. The rivet head 4 has a flat upper side 10 and a cylindrical head outer face 12. The head outer face 12 has a diameter $d_K$ and an axial height $H_K$.

The rivet shank 6 has a cylindrical shank outer face 14 and a cylindrical shank inner face 16 that delimits the shank hole 8. The cylindrical shank outer face 14 has a shank outer diameter $d_N$, and the cylindrical shank inner face has a shank inner diameter $d_i$.

The head outer face 12 is connected to the shank outer face 14 via an underhead chamfer 18 and a radius $R_4$ (the term "radius" in the present scope is to be understood to mean an annular face that in an axial section has the shape of an arc with the radius R).

The radius $R_4$ runs tangentially both into the underhead chamfer 18 and also into the shank outer face 14, while the underhead chamfer 18 directly adjoins the head outer face 12 (e.g., via a radius or a sharp edge). The underhead chamfer 18 encloses an angle β with a radial plane of the punch rivet 2.

At the rivet foot end the shank outer face 14 is connected to the shank inner face 16 via a first radius $R_1$ with the center M1 and a second radius $R_2$ with the center M2 as well as optionally a third radius $R_3$. The radius $R_1$ merges tangentially both into the shank outer face 14 and into the second radius $R_2$. The second radius $R_2$ merges tangentially either directly into the shank inner face 16 or into the third radius $R_3$, which in turn merges tangentially into the shank inner face 16.

As can be seen clearly in FIG. 1, the radius $R_1$ is much smaller than the radius $R_2$. The common tangent Tan of the radii $R_1$ and $R_2$, which tangent stands perpendicular to the connectors of centers M1 and M2, encloses an angle α with a radial plane E of the punch rivet 2.

At the rivet head end, the shank hole 8 has a conical floor face 24 of a cone angle γ that is connected to the shank inner face 16 by means of an outer shank hole radius $R_5$ and ends in a radius $R_6$ in the region of the central axis X. The shank hole 8 has a shank hole depth $t_B$, which is measured from the rivet foot end to the point at which the notional extensions of the conical floor face 24 and of the shank inner face 16 intersect. The thickness of the rivet head 12 on the central axis X is designated $D_K$.

Before going into the specific value ranges of the quantities determining the geometry of the punch rivet according to the invention, the basic considerations that led to the present invention will be outlined with reference to FIG. 2. As has already been explained at the outset, in the prior art when judging a finished punch rivet connection, on the one hand the undercut H of the spread rivet shank section and on the other hand the axial minimum thickness $t_{min}$ of the die-side part to be joined (sheet) are brought in as a quality criterion. In principle the aim was to make the undercut H and the minimum thickness $t_{min}$ as large as possible.

In contrast, the present invention starts from the consideration that in addition to the undercut H and the minimum thickness $t_{min}$, essential quality criteria of the punch rivet connection are the engagement length L, the bearing depth T, and the radial thickness $t_{NF}$ of the part to be joined (sheet) that surrounds the rivet foot. As is shown by FIG. 2, the engagement length L is the length of the engagement between the outer face of the rivet shank 6 and the die-side part to be joined 26, and the bearing depth T is the axial component of the engagement length L. The radial thickness $t_{NF}$ of the die-side part to be joined 26 that surrounds the rivet foot is measured at the radially outermost point of the rivet foot.

According to the teaching of the present invention, in principle the aim is to maximize the engagement length L, the bearing depth T, and the radial thickness $t_{NF}$. As was determined on the basis of extensive tests, in this manner the bearing behavior of the punch rivet connection can be improved and optimized, as will be explained in more detail below.

Other considerations on which the invention is based relate to the configuration of the rivet head, the rivet shank, and the die used to produce the rivet connection, as will likewise be explained in more detail below.

Configuration of the Rivet Foot

The geometry of the rivet foot according to the exemplary embodiment of the present invention shown is determined by the following value ranges:

$$R_1 = 0.3 \pm 0.2 \text{ mm}$$

$$R_2 = (0.7 \text{ to } 1.2)(d_N - d_i)/2, \text{ in particular } R_2 = (0.8 \text{ to } 1.0)(d_N - d_i)/2$$

$$\alpha = 10° \pm 20°.$$

The radius $R_1$ can be replaced by a chamfer of, for example, 45°, as long as the length of the chamfer is not greater than the corresponding secant line of the radius $R_1$.

These value ranges hold true for the case in which the radius $R_2$ merges directly tangentially into the shank inner face 16. If no radius $R_2$ that touches both the radius $R_1$ and also the shank inner face 16 can be found within the given value range, the radius $R_2$ is to be connected to the shank inner face via a further radius $R_3$. The following value ranges are then to be selected for $R_3$ and the angle α:

$$\alpha = 5° \pm 10°$$

$$R_3 = 0.8 \pm 0.4 \text{ mm}.$$

If the radius $R_1$ is less than equal to 0.2 mm, the angle α is expediently $\alpha = 5° \pm 10°$. With a larger radius $R_1$ (up to 0.4 mm), the angle α can be $\alpha = 10° \pm 20°$.

An essential parameter of the geometry of the rivet foot is the angle α that the common tangent Tan of the radii $R_1$ and $R_2$ encloses with the radial plane E of the punch rivet. As is shown and results from the given value ranges, the angle α is very small and can even be negative. This makes it clear that the rivet foot, in contrast to the prior art, is embodied blunt to a certain extent, i.e. has no sharp-edged cutting edge in the narrower sense. These facts have a considerable influence on the punch rivet process and the embodiment of the punch rivet connection, as will now be explained with reference to FIG. 3 through FIG. 6, using as an example a punch rivet connection between two parts to be joined (sheets):

As is known, in punch riveting the parts to be joined 26, 28 are held between the upper side of a die 30 and the lower side of a hold-down device 32. The die 30 has a cavity 34 that is delimited by a floor face 36, preferably in the form of a projection (mandrel) and a cylindrical circumferential face 38. During the joining process the punch rivet 2 is pressed into the parts to be joined 26, 28 by a punch (not shown) and shaped sections of the parts to be joined 26, 28 are hereby deformed into the cavity 34 of the die 30. The punch rivet punches through the punch-side part to be joined 28, hereby separates off a slug 28a from the part to be joined 28, and deforms the die-side part to be joined without punching through it. By these means a type of "driven head" is formed, so that the two parts to be joined 26, 28 are held together positively between the rivet head 4 and the "driven head".

The above-defined geometry of the rivet foot has the following effects on the joining process and the embodiment of the punch rivet connection:

a) In the first part of the joining process the rivet foot punches through the punch-side part to be joined 28 without excessive deformation of the part to be joined 28. This is therefore largely a pure punching or cutting process.

b) Since in this punching process the rivet foot essentially penetrates the punch-side part to be joined 28 in a cutting process, the rivet foot and the rivet shank do not suffer any greater deformation. This is illustrated by FIG. 4 and FIG. 5. The consequence is that the setting force required to punch through the punch-side part to be joined 28 is relatively low.

c) The rivet foot now presses the punched-through slug 28a downwards together with the die-side part to be joined 26 into the cavity 34 of the die 30, until the lower part to be joined 26 bears against a floor face 36 of the die 30.

d) When the die foot has punched through the punch-side part to be joined 28, the rivet foot "slides" radially outwards and axially downwards on the face of the slug 28a, so that the material of the slug 28a is extruded radially inwards inside the shank hole 8 and the die-side part to be joined 26 is deformed radially outwards and axially towards the die floor (FIGS. 5, 6). The undercut H (FIG. 2) is formed hereby. The die-side part to be joined 26 surrounds the rivet foot, without the die-side part to be joined being thinned too greatly radially and axially or even cut through.

In brief, the joining process is thus characterized in that the punch-side part to be joined 28 is largely punched through in a pure cutting process, without the rivet shank 6 and the punch-side part to be joined 28 being deformed excessively, and that the expanding (spreading) of the rivet shank 6 does not take place until the penetration into the die-side part to be joined 26. The result of this is that the engagement length L, the bearing depth T, and the radial thickness $t_{NF}$ of the die-side part to be joined 26 surrounding the rivet foot are maximized.

The consequence is that the force closure (friction closure) between the rivet shank 6 and the parts to be joined 26, 28 supplies an essential contribution to the bearing behavior. In particular the specific loading of the force-transmitting regions between the punch rivet 2 and the parts to be joined 26, 28 is minimized hereby. Moreover a reduction in the radial compression stresses within the punch rivet connection results, so that with an outer loading of the punch rivet connection, the sum of outer and inner stresses remains within justifiable limits. Furthermore, through the maximization of L, T, and $t_{NF}$ with an adequate undercut H and minimum thickness $t_{min}$, the surface compression between the punch rivet 2 and the parts to be joined 26, 28 is reduced, by means of which the stiffness and fatigue strength of the punch rivet connection are improved.

A further important advantage of this configuration of the punch rivet connection comprises, as already mentioned, a significant reduction in the setting force required to produce the punch rivet connection. This not only has an advantageous effect on the configuration and the operation of the setting tool, but above all results in the requirements for hardness and strength of the punch rivets being clearly reduced. Thus punch rivets for the production of a punch rivet connection between parts to be joined made of specified materials can be used whose hardness and strength are considerably lower than in the prior art. For example, rivets of conventional aluminum alloys such as e.g. AlMgSi1 can be used for the riveting of aluminum semi-finished products.

A further advantage of the described embodiment of the punch rivet connection is that gaps between the punch rivet on the one hand and the parts to be joined on the other hand, as well as between the parts to be joined together, are avoided or at least minimized. Together with the other properties of the punch rivet connection, this has an advantageous effect on the bearing behavior and in particular on the fatigue strength behavior of the punch rivet connection.

Configuration of the Rivet Head

The configuration of the rivet foot must be seen in combination with the configuration of the rest of the punch rivet, in particular the rivet head, the rivet shank, and the shank hole.

In the exemplary embodiment shown, the rivet head 4 is embodied as a countersunk head with a conical underhead chamfer 18 that is connected to the shank outer face 14 through the radius $R_4$ and intersects the cylindrical head outer face 12.

The following holds true for the head diameter $d_K$ of the rivet head 4 embodied as a countersunk head:

$$d_K = (1.3 \text{ to } 1.8)d_N, \text{ in particular } d_K = (1.4 \text{ to } 1.65)d_N.$$

The following holds true for the axial length $H_K$ of the head outer face 12:

$$H_K = (0.025 \text{ to } 0.2)d_N, \text{ in particular } H_K = (0.025 \text{ to } 0.12) d_N.$$

$H_K$ must be selected larger as the head diameter $d_N$ increases. The given ranges hold true in particular for shank outer diameter $d_N \leq 6$ mm.

The angle β, which the underhead chamfer 18 encloses with a radial plane, is in the range of 25°±10°, in particular 25°±7°. The radius $R_4$ is 0.6±0.4 mm, in particular 0.5±0.2 mm.

As indicated by a dashed line on the right-hand side of FIG. 1, the underhead chamfer can also be embodied slightly curved, wherein the curvature should deviate only slightly from the conical face and the curvature radius should be $R_7 \geq 2.0$ mm.

The angle β or the radius $R_7$ and the radius $R_4$ are hereby selected such that the force for closing the gap between the rivet head 4 and the punch-side part to be joined 28 (FIG. 2 and FIG. 6) and thus the setting force is as low as possible. The size of the setting force is influenced to a considerable extent by the difference between the angle β or the radius $R_7$ of the underhead chamfer 18 and the corresponding angle of the upper side of the punched-through punch-side part to be joined 28 as well as by the size of the radius $R_4$.

If the angle β is too large or the radius $R_7$ is too small, a very high setting force is required in order to close the gap between head underside and punch-side part to be joined 28. If the angle β is too small, a gap forms between the punch rivet 2 and the punch-side part to be joined 28 in the region of the radius $R_4$. The rivet head 4 is then loaded to bending and can easily break off when an attempt is made to close this gap by means of a correspondingly large setting force.

If the radius $R_4$ is selected too large (as is the case in the prior art for example with the so-called C-rivet), the punch rivet must correspondingly deform the adjacent corner of the punched-through punch-side part to be joined 28 in the region of the radius $R_4$ and hereby must partially also displace material of the punch-side part to be joined 28 radially outwards. A very high force is required for this, which in turn increases the size of the required setting force. If the radius $R_4$ is too small, the notch effect caused hereby can lead to a breakage of the rivet head 4.

The described rivet head embodied as a countersunk head, in particular the above-defined underhead geometry, is quite generally suited to the riveting of parts to be joined that are made of all metallic materials and if desired also of other materials. In the joining of plastics, in particular fiber-reinforced plastics, rivet heads with a flat seating, so-called flat heads, with small transition radii to the rivet head can also be expedient. In these cases in general the head diameter $d_K$ is selected larger than with the countersunk head rivets, in order to reduce the specific surface loading between the rivet head underside and the upper side of the punch-side part to be joined. The size of the rivet head diameter then lies outside the above-defined range.

Configuration of the Rivet Shank with Shank Hole

In the prior art the shank outer diameter $d_N$ of semi-hollow punch rivets is usually between 3 and 8 mm, and the wall thickness of the rivet shank is usually between 0.5 and 2.0 mm. The total length of the punch rivet is seldom greater than 10 mm. Semi-hollow punch rivets used in automotive engineering to connect car body components frequently have a shank outer diameter $d_N$ of 5.3 mm or 3.2 mm.

The shank outer diameter $d_N$ can also be selected in these ranges for punch rivets according to the present invention.

Preferably the shank outer diameter $d_N$ is in the range of 5.0 to 6.0 mm. As will be explained in more detail, however, with punch rivets according to the present invention the shank outer diameter $d_N$ can be selected in principle somewhat larger than in the prior art, since the punch rivets embodied according to the invention require lower setting forces.

The shank inner diameter $d_i$ is preferably (0.5 to 0.8) $d_N$. The following value ranges hold true preferably for the quantities $R_5$, $R_6$, $\gamma$, $T_B$ and $D_K$:

$R_5 = 0.7 \pm 0.5$ mm, in particular $R_5 = 0.8 \pm 0.3$ mm $R_6 = 0.9 \pm 0.5$ mm, in particular $R_6 = 0.8 \pm 0.3$ mm $\gamma = 110°$ to $140°$, in particular $\gamma = 110°$ to $130°$ $t_B \geq 0.2 d_N$, in particular $t_B \geq 0.3 d_N$ $D_K \geq 0.15 d_N$.

The given value ranges for the quantities determining the shank geometry ensure that the rivet shank 6 can be endowed in every application case with an adequate pressure stability (no inadmissible compressing during the joining process), an adequate buckling strength and bulging strength (no buckling and/or bulging of the rivet shank during the joining process) and an adequate bending strength and compression strength (targeted deformation during the joining process).

The geometry shown and in particular the angle $\gamma$ of the shank hole were selected in order to facilitate the manufacture of the shank hole. It should be pointed out, however, that the geometry of the shank hole can also be selected to be different. Thus for example the floor of the shank hole can be embodied in the shape of a dome, that is, in the form of an arc with a transition to the shank inner face 16 via the radii $R_5$. Other hole geometries are also possible.

Production of the Punch Rivet

As already mentioned, the punch rivets according to the present invention enable distinctly reduced setting forces in comparison with the prior art. Tests have shown that the setting forces required for the production of the punch rivet connection are lower by an order of magnitude of 20%. This in turn allows the shank outer diameter $d_N$ and thus also the shank inner diameter $d_i$ to be made larger than in the prior art, without endangering the pressure stability, buckling strength and bulging strength, and the bending strength and compression strength of the punch rivet.

An enlargement of the shank outer diameter $d_N$ of the punch rivet enables a technically easier and more economical production of the punch rivet:

In the production of punch rivets by cold forming, the shank hole is shaped by means of a so-called pin. The smaller the cross section of the shank hole 16 and thus of the pin, the more difficult the production of the punch rivet.

It must be taken into consideration hereby that the costs for the rivet production depend essentially on the costs for the production tools, wherein the service life of the production tools plays a decisive role. An enlargement of the cross section of the shank hole and thus of the pin leads to a significant facilitation of the production and moreover—because of the improved guiding of the pin—to an improvement in the production accuracy of the shank hole. The service life of the production tools is lengthened disproportionately by this, so that the costs for the rivet production are correspondingly reduced.

With these considerations it must also be taken into account that a small change in the shank outer diameter $d_N$ can result in quite a large change of the shank inner diameter $d_i$, without impairing the stability of the punch rivet. A change in the shank outer diameter $d_N$ by 0.3 mm for example allows a change in the shank inner diameter $d_i$ by 0.4 mm, without the pressure stability of the rivet shank being impaired. A change in a shank inner diameter $d_i = 2.9$ by 0.3 mm leads to a cross section enlargement of the pin by 33%, and a change by 0.4 mm leads to a cross section enlargement of the pin by 41%.

It is clear from these numerical examples that the punch rivets embodied according to the invention can be produced considerably more economically than punch rivets of the prior art.

Configuration of the Die

The die 30 used in the production has a considerable influence on the joining process and the formation of the punch rivet connection, in particular the volume or the diameter $D_M$ of the cylindrical circumferential face 38 of the cavity 34 of the die 30, see FIGS. 2 through 6.

The following preferably holds true for the diameter $D_M$:

$D_M = d_N + (0.6 \text{ to } 1.5) 2 t_M$, in particular $D_M = d_N + (0.7 \text{ to } 1.2) 2 t_M$ for parts to be joined that are made of materials of good deformability, in particular wrought alloys. $t_M$ is hereby the thickness of the die-side part to be joined 26. Thus the diameter $D_M$ of the die 30 increases with the thickness of the die-side part to be joined 26. Expediently the depth $T_M$ of the cavity 34 of the die 30 with the thickness of the die-side part to be joined 26 should also be selected larger. The following preferably holds true:

$T_M = (1.0 \text{ to } 2.5) t_M$, in particular $T_M = (1.1 \text{ to } 2.2) t_M$.

The value ranges given result in diameters $D_M$ of the circumferential face 38 of the dies that are small in comparison with the prior art. This reduction in the cavity of the die, in particular of the diameter $D_M$, reduces the so-called "cut gap", i.e. the gap between the shank outer diameter $d_N$ and the die inner diameter, i.e. the diameter $D_M$. This in turn promotes the processes explained in the context of the configuration of the rivet foot in the joining process. In particular the punch-through of the punch-side part to be joined 28 in a "cut process", the deformation of the die-side part to be joined 26, and the corresponding movements and deformations of the rivet shank 6 are promoted by this.

The following preferably holds true for parts to be joined that are made of cast materials as well as of other materials of low deformability or low elongation at break such as e.g. magnesium:

$D_M \leq 2.2 d_N$ $T_M \leq 0.15 D_M$.

In the exemplary embodiment of FIG. 3 through FIG. 6 the floor face 36 of the die 30 is provided in the conventional manner with a mandrel projecting upwards. FIG. 7 shows an embodiment according to the invention of a die 30', in which the floor face 36' is provided with a central depression 40. In the exemplary embodiment shown, the depression 40 is embodied cylindrical and has a diameter $D_{EB} \leq 0.5 D_M$ and a depth $T_{EB} \geq 0.3 d_N$. The following holds true for the radius $R_{EB}$:

$R_{EB} \geq 0.3$ mm, in particular 0.4 to 1.0 mm.

The depression 40 ensures a pressure relief during the joining process, through which excessive radial stresses in the punch rivet connection are avoided and the danger of a crack formation is reduced. Expediently its dimensions—diameter and depth—can also be oriented to the diameter of the shank hole or the thickness of the die-side part to be joined and are then $D_{EB} \geq di$ $T_{EB} \geq 0.1 T_M$, e.g. $\geq 0.1$ mm.

FIGS. 8 and 9 show a modified embodiment of a punch rivet 2'. Whereas in the exemplary embodiment of FIG. 1 through FIG. 6 the shank outer face 14 is embodied cylindrically, the shank outer face of the modified punch rivet 2' is provided with an axial ribbing 42. The axial ribbing 42 forms an anti-rotation element during the joining process, which is advantageous in particular when the punch rivet is embodied as a functional element (not shown) with a bolt-shaped or nut-shaped attachment on the rivet head. The ribbing 42 running axially moreover ensures a good guiding of the punch rivet 2', without the required joining force being increased by this.

What is claimed:

1. A punch rivet with a rivet head and a rivet shank with a central shank hole that have a common central axis X, wherein
    the rivet head has an essentially cylindrical head outer face of a specified head diameter $d_K$,
    the rivet shank has a shank outer face of a specified shank outer diameter $d_N$ and a shank inner face of a specified shank inner diameter $d_i$ delimiting the central shank hole,
    the head outer face and the shank outer face are connected by means of a conical or slightly curved underhead chamfer and an underhead radius $R_4$, which radius merges tangentially both into the underhead chamfer and into the shank outer face, and
    the shank outer face and the shank inner face are connected at the rivet foot end via a radially outer first radius $R_1$ and a radially inner second radius $R_2$ that merge into one another tangentially, wherein the common tangent Tan encloses an angle $\alpha$ with a radial plane of the punch rivet,
    wherein the first radius $R_1$ merges tangentially into the shank outer face or is replaced by a chamfer of corresponding length, and the second radius $R_2$ merges tangentially into the shank inner face, and
    wherein the following value ranges hold true for the first radius $R_1$, the second radius $R_2$, and the angle $\alpha$:

$R_1 = 0.3 \pm 0.2$ mm $R_2 = (0.7 \text{ to } 1.2)(d_N - d_i)/2$ $\alpha = 10° \pm 20°$.

2. The punch rivet according to claim 1, wherein the following holds true for the second radius $R_2$:

$R_2 = (0.8 \text{ to } 1.0)(d_N - d_i)/2$.

3. The punch rivet according to claim 1, wherein the conical underhead chamfer encloses an angle $\beta = 25° \pm 10°$ with a radial plane of the punch rivet.

4. The punch rivet according to claim 3, wherein the angle $\beta = 25° \pm 7°$.

5. The punch rivet according to claim 1, wherein the slightly curved underhead chamfer has a radius $R_7 \geq 2.0$ mm.

6. The punch rivet according to claim 1, wherein the following holds true for the underhead radius $R_4$:

$R_4 = 0.6 \pm 0.4$ mm.

7. The punch rivet according to claim 6, wherein $R_4 = 0.5 \pm 0.2$ mm.

8. The punch rivet according to claim 1, wherein the following holds true for the shank inner diameter $d_i$:

$d_i = (0.5 \text{ to } 0.8) d_N$.

9. The punch rivet according to claim 1, wherein the following holds true for the head diameter $d_K$ of the rivet head:

$d_K = (1.3 \text{ to } 1.8) d_N$.

10. The punch rivet according to claim 9, wherein $d_K = (1.4 \text{ to } 1.65) d_N$.

11. The punch rivet according to claim 1, in which the rivet head end of the shank hole is embodied closed, characterized in that the closed end of the shank hole has a conical floor face that merges into the shank inner face via an outer shank hole radius $R_5$ and ends in an inner shank hole radius $R_6$ in the region of the central axis X.

12. The punch rivet according to claim 1, wherein the following holds true for the axial length $H_K$ of the head outer face:

$H_K = (0.025 \text{ to } 0.2) d_N$.

13. The punch rivet according to claim 12, characterized in that the following holds true for the outer shank hole radius $R_5$:

$R_5 = 0.7 \pm 0.5$ mm.

14. The punch rivet according to claim 13, wherein the cone angle $\gamma$ of the conical floor face is 110° to 140°.

15. The punch rivet according to claim 14, wherein the cone angle $\gamma$ is 110° to 130°.

16. The punch rivet according to claim 13, wherein the following holds true for the inner shank hole radius $R_6$:

$R_6 = 0.9 \pm 0.5$ mm.

17. The punch rivet according to claim 16, wherein $R_6 = 0.8 \pm 0.3$ mm.

18. The punch rivet according to claim 13, wherein the following holds true for the depth $t_B$ of the shank hole from the rivet foot end to the point at which notional extensions of the conical floor face and the shank inner face intersect:

$t_B \geq 0.2 d_N$.

19. The punch rivet according to claim 18, wherein $t_B \geq 0.3 d_N$.

20. The punch rivet according to claim 13, wherein the following holds true for the thickness $D_K$ of the rivet head on the central axis X:

$D_K \geq 0.15 d_N$.

21. The punch rivet according to claim 13, wherein $R_5 = 0.8 \pm 0.3$ mm.

22. The punch rivet according to claim 12, wherein $H_K = (0.025 \text{ to } 0.12) d_N$.

23. The punch rivet according to one claim 1, wherein the shank hole is embodied open at the rivet head end.

24. The punch rivet according to claim 1, wherein the punch rivet is a functional element.

25. The punch rivet according to claim 24, wherein the functional element is a punch bolt or punch nut.

26. The punch rivet according to claim 1, wherein the rivet shank has an essentially cylindrical shank outer face or a shank outer face provided with an axial ribbing.

27. A punch rivet with a rivet head and a rivet shank with a central shank hole that have a common central axis X, wherein
    the rivet head has an essentially cylindrical head outer face of a specified head diameter $d_K$,
    the rivet shank has an essentially cylindrical shank outer face of a specified shank outer diameter $d_N$ and an essentially cylindrical shank inner face of a specified shank inner diameter $d_i$ delimiting the central shank hole, the head outer face and the shank outer face are connected by means of a conical or slightly curved underhead chamfer and an underhead radius $R_4$, which radius merges tangentially both into the underhead chamfer and into the shank outer face, and the shank outer face and the shank inner face are connected at the rivet foot end via a radially outer first radius $R_1$ and a radially inner second radius $R_2$ that merge into one another tangentially, wherein the common tangent Tan encloses an angle α with a radial plane of the punch rivet, wherein the first radius $R_1$ merges tangentially into the shank outer face or is replaced by a chamfer of corresponding length, and the second radius $R_2$ is connected to the shank inner face via a third radius $R_3$, which radius merges tangentially both into the second radius $R_2$ and into the shank inner face, and wherein the following value ranges hold true for the first radius $R_1$, the second radius $R_2$, the third radius $R_3$, and the angle α:

$R_1 = 0.3 \pm 0.2$ mm $R_2 = (0.7 \text{ to } 1.2)(d_N - d_i)/2$ $R_3 = 0.8 \pm 0.4$ mm $\alpha = 5° \pm 10°$.

* * * * *